United States Statutory Invention Registration [19]

[11] Reg. Number: H509

Chao

[43] Published: Aug. 2, 1988

[54] PREPARATION OF ADHESIVES

[76] Inventor: Hung-Ya Chao, 10 Presidio Pl., Williamsville, Erie, N.Y. 14221

[21] Appl. No.: 136,325

[22] Filed: Dec. 22, 1987

[51] Int. Cl.[4] ..... C08F 26/10; C08F 20/06; C08F 120/06; C08F 220/06

[52] U.S. Cl. ..... 526/264; 526/318.43; 526/931; 526/318.4

[58] Field of Search ..... 526/264

[56] References Cited

U.S. PATENT DOCUMENTS

| | | | |
|---|---|---|---|
| 3,720,534 | 3/1973 | Macauley et al. | 526/202 |
| 4,243,736 | 1/1981 | Herrmann | 526/264 |
| 4,510,197 | 4/1985 | Shah | 526/264 |

FOREIGN PATENT DOCUMENTS

| | | | |
|---|---|---|---|
| 8202559 | 8/1982 | World Int. Prop. O. | 526/264 |
| 62-32109 | 2/1987 | Japan | 526/264 |

*Primary Examiner*—John F. Terapane
*Assistant Examiner*—J. E. Thomas

[57] ABSTRACT

Adhesives comprising microparticles of acrylate copolymers are formed from higher homologs of acrylates and methacrylates. By varying the type and amount of monomers used in the starting solution the tack level may be varied. Very high tack levels are achieved with compositions made from isodecyl acrylate and 2-ethylhexyl acrylate where acrylic acid, isobornyl acrylate and vinyl pyrrolidone are included in the starting mixture and where polyvinyl alcohol is used to avoid agglomeration.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PREPARATION OF ADHESIVES

BACKGROUND OF THE INVENTION

This invention relates to the preparation of microspheres from acrylates and methacrylates, which microspheres have improved adhesive properties.

U.S. Pat. No. 3,720,534, which is hereby fully incorporated by reference, teaches a method of acrylate gel formation by a suspension polymerization. The polymeric microparticles have occluded in situ about 35–80% by weight of a non-volatile, non-drying oil.

Although acrylate polymers are well-known for their intrinsic adhesive properties, the microparticles prepared according to U.S. Pat. No. 3,720,534 do not have good adhesive properties, because the polymers have too high a glass transition temperature and also the microparticles contain too much oil inside the particles.

It is known prior art that a tacky adhesive may be produced by polymerizing an acrylate or methacrylate. Such polymers can be deposited on bond paper and used as pressure sensitive adhesive. While the use of acrylates and methacrylates in general to form adhesives are known, it would nevertheless be advantageous to vary the level of tack. If such variations in tack level could be achieved it would be possible to produce an adhesive having an appropriate tack level required in a specific application.

SUMMARY OF THE INVENTION

The present invention, therefore, provides modified formulations so that microparticles prepared following the general procedures taught in U.S. Pat. No. 3,720,534 will have improved degrees of adhesive properties. Thus, when these microparticles are coated onto a substrate support, such as plastic film, foam, paper, etc., the coated sheets would provide from low to moderate, to high levels of adhesive strength.

More specifically, it has now been found that variations in tack level can be achieved by using the general procedures of microsphere preparation taught in U.S. Pat. No. 3,720,534 and using a group of monomeric components similar to that previously known in the above referenced prior art formulation, except that in the present invention (1) lower oil contents are used and (2) additional modifying monomers are used.

It has been found that by making these changes a series of tack levels can be achieved allowing one to select the necessary starting components and modifiers to achieve a desired tack level.

Not only has it been possible to vary resulting tack level by making these changes, but surprisingly it has been found that certain particular combinations of acrylates and modifying monomers result in much higher than expected tack levels. Thus, when isodecyl acrylate or 2-ethylhexyl acrylate are mixed in a weight ratio of about from 99:1 to 85:15 acrylate to a modifying monomer such as acrylic acid, vinyl pyrrolidone or isobornyl acrylate unexpectedly high tack levels are achieved.

DETAILED DESCRIPTION OF THE INVENTION

It has now been found that acrylates and methacrylates with approximately 4–14 carbons can be used to achieve a desired range of adhesive qualities when their corresponding homopolymers are prepared in the manner of the present invention. These acrylates and methacrylates have glass transition temperatures in the range of from about −15° C. to −80° C., therefore providing desirable service temperatures in the range of from about −10° C. to 40° C.

The acrylates and methacrylates which exemplify such desirable starting materials are for example hexyl acrylate, octyl acrylate, decyl acrylate, isodecyl acrylate, dodecyl acrylate, heptyl acrylate, 1- or 2-methylbutyl acrylate, 2-methylpentyl acrylate, 6-methylnonyl acrylate, 2-ethylhexyl acrylate, and 4-methyl-2-pentyl acrylate.

It has also been found that the addition of minor amounts of a modifying monomer such as acrylic acid, beta-carboxyl-ethyl acrylate, methacrylic acid, maleic anhydride, isobornyl acrylate, itaconic acid, and vinyl pyrrolidone can be used to increase the aggressiveness of the adhesive. For the purposes of the present invention, from about 1% to approximately 20% by weight, preferrably about 1% to 10% of such a modifying monomer is advantageously used.

For less aggressive adhesive applications, and in order to extend range of tack levels on the lower end, it has been found that acrylate or methacrylate monomers such as tetraethyleneglycol diacrylate, tetraethyleneglycol dimethacrylate, 1,6-hexanediol diacrylate, 1,6-hexanediol dimethacrylate, pentaerythritol triacrylate, pentaerythritol tetracrylate, trimethylolpropane triacrylate, diethyleneglycol diacrylate, diethyleneglycol dimethacrylate, 1,4-butanediol dimethacrylate, and 1,3 butyleneglycol diacrylate, may be used.

As the oil component of the invention polybutene oil with a molecular weight in the range of 400 to 2,300 is particularly useful although many other oils such as dibutyl phthalate, butylbenzyl phthalate, alkylated biphenyls, alkylated naphthalenes, paraffin and isoparaffin oils, can also be used. The oil component will generally be used at a level of from 0 to 50% by weight of the acrylate or methacrylate monomer used.

Polyvinyl alcohol (PVA) is used as a suspension agent during polymerization in order to keep each microparticle away from the other without agglomeration. PVA also serves as a binder so after completing the polymerization, the microparticle slurry is ready for coating onto paper. PVA with about 75–90% hydrolysis with a molecular weight in the range 2,000–250,000 been found to be useful in the invention. PVA used in higher concentrations results in adhesives having lower tack, while if used at lower concentrations the adhesives will have higher tack, but if it were used at too low concentrations, instability of the adhesive slurry resulted and agglomeration of the microparticles occurred. Generally from 1 to 3% by weight based on the acrylate or methacrylate monomer will be used.

The general procedures for making microparticles will now be described.

50–100 parts of an acrylate monomer or monomer mixture and 0–50 parts of an oil are stirred at room temperature for complete dissolution. 0.1–1.5 parts of a free radical initiator such as dicumyl peroxide, di-ter-butyl peroxide, benzoyl peroxide, or azodiisobutyronitrile is added into the solution. The solution is then mixed with about 100–300 parts of deoxygenerated 1.5% aqueous PVA solution. The content is allowed to react at 65°–90° C. under nitrogen, and stirred at a speed of from 500–700 rpm for about 4–24 hours to complete the polymerization.

After polymerization, polyacrylate microparticles of between 5–200 microns size are obtained. The slurry can then be coated and dried on a substrate such as paper at a coating weight of 3–8 g/m$^2$. The sheet can then be tested for adhesive strength using "Grams of Tack" from a Polyken Probe Tack Tester.

Using this general procedure the following experiments were run in an effort to determine the effect of varying the starting monomer, amount of oil and the amount of added modifying monomer on the tack level achieved in the final product.

EXAMPLE 1

114 parts of isodecylacrylate and 30 parts of Amoco polybutene oil H-1900 were stirred at room temperature until the latter was completely dissolved in the former. 6 parts of vinyl pyrrolidone was added into the solution, followed by dissolving 0.405 parts of benzoyl peroxide into it. Into a 1000 ml 4-necked flask was placed 150 parts of 1.5% aqueous Vinol 523 (a partially hydrolyzed polyvinyl alcohol from Air Products and Chemicals) solution followed by the addition of the above acrylate solution. The 4-necked flask was equipped with a thermometer, a mechanical stirrer, a reflux condenser, and a nitrogen inlet tube. Through the reflux condenser, vacuum was applied for about 10 minutes to purge the oxygen out of the flask. Nitrogen was flushed into the solution. A nitrogen blanket was maintained during the entire polymerization reaction. After setting the mechanical stirrer at a speed of about 600 rpm, the container was heated in a heating jacket to 65°–85° C. The reaction was run for 16 hours. Microparticles ranging from 20–140 microns were obtained.

The slurry was deposited on a 20# bond paper using a wire wound coating rod to deposit a dry coating weight of about 4–7 g/m$^2$. The resultant sheet has the capacity to adhere to other surfaces the manner of a pressure sensitive adhesive label. The tack is 214 grams measured by a Polyken Probe Tack Tester.

EXAMPLES 2–18

The procedures set up in Example 1 were repeated except that the following acrylate/oil mixtures were used. Also, PVA with different molecular weights were used.

| | (Parts) Acrylate/Monomer | (Parts) Oil | Emulsifier | Particle Size (μ) | Tack Level |
|---|---|---|---|---|---|
| Ex. 2 I | (120) | #1 (30) | V523 | 20–140 | 97 |
| Ex. 3 I | (114)/#1 (6) | #1 (30) | RX 2435 | 20–100 | 210 |
| Ex. 4 I | (135) | #3 (15) | RX 2435 | 20–80 | 87 |

-continued

| | (Parts) Acrylate/Monomer | (Parts) Oil | Emulsifier | Particle Size (μ) | Tack Level |
|---|---|---|---|---|---|
| Ex. 5 II | (114)/#1 (6) | #1 (30) | RX 2435 | 20–100 | 224 |
| Ex. 6 II | (119.64)/ #5 (0.36) | | V523 | 15–200 | 46 |
| Ex. 7 I | (142.5)/#4 (7.5) | | V523 | 20–100 | 158 |
| Ex. 8 I | (135) | #1 (15) | RX 2435 | 5–140 | 96 |
| Ex. 9 I | (120) | #2 (30) | V205 | 10–180 | 107 |
| Ex. 10 II | (119.64)/ #6 (0.36) | #1 (30) | RX 2435 | 20–180 | 51 |
| Ex. 11 I | (142.5)/#3 (7.5) | | V523 | 15–190 | 242 |
| Ex. 12 I | (120) | #4 (30) | V523 | 20–100 | 89 |
| Ex. 13 I | (120) | #5 (30) | G20-90 | 10–150 | 82 |
| Ex. 14 II | (114)/#2 (6) | #1 (30) | RX 2435 | 20–100 | 102 |
| Ex. 15 I | (114.24)/ #3 (5.4)/ #6 (0.36) | #1 (30) | V523 | 10–80 | 49 |
| Ex. 16 I | (150) | | V523 | 80–160 | 88 |
| Ex. 17 I | (130)/#7 (20) | | V523 | 20–140 | 211 |
| Ex. 18 I | (140)/#7 (10) | | V523 | 20–150 | 198 |

Note:
In Example 2–18 the notations mean the following:
Acrylate: I = isodecyl acrylate
II = 2-ethylhexyl acrylate
Modifying Monomer:
#1 = acrylic acid
#2 = maleic anhydride
#3 = vinyl pyrrolidone
#4 = beta-carboxyl-ethyl acrylate
#5 = trimethylol propane triacrylate
#6 = 1,6-hexanediol diacrylate
#7 = isobornyl acrylate
Oil #1 = H-100 polybutene oil from Amoco Chemicals
Oil #2 = L-100 polybutene oil from Amoco Chemicals
Oil #3 = dibutyl phthalate
Oil #4 = Isopar M isoparaffin oil from Exxon Chemicals
Oil #5 = Isopar G isoparaffin oil from Exxon Chemicals
PVA is polyvinyl alcohol; V205 and V523 are Vinol 205 and 523 from Air Products and Chemicals; RX 2435 and G20-90 are from Monsanto.

As can be seen from the Examples a wide range of tack levels can be achieved. Both lower and higher tack levels can be achieved by varying the make-up of the monomeric starting materials.

What is claimed is:

1. An adhesive composition which comprises a copolymer of (a) isodecyl acrylate or 2-ethylhexyl acrylate, and (b) acrylic acid, or vinyl pyrrolidone, the ratio of (a) to (b) by weight being from 99:1 to 85:15.

2. An adhesive composition as in claim 1 wherein said composition consisting essentially of a copolymer of 99 parts weight isodecyl acrylate and 1 part by weight acrylic acid.

3. An adhesive composition as in claim 1 wherein said composition is a copolymer of 99 parts by weight 2-ethylhexyl acrylate and 1 part by weight acrylic acid.

4. An adhesive composition as in claim 1 wherein said composition is a copolymer of 85 parts by weight isodecyl acrylate and 15 parts by weight vinyl pyrrolidone.

* * * * *